United States Patent
Lohmar et al.

(10) Patent No.: US 7,885,642 B2
(45) Date of Patent: Feb. 8, 2011

(54) METHOD AND DEVICE FOR PERFORMANCE OPTIMISATION OF A DATA DISTRIBUTION NETWORK

(75) Inventors: Thorsten Lohmar, Aachen (DE); Uwe Horn, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 11/718,481

(22) PCT Filed: Nov. 3, 2004

(86) PCT No.: PCT/EP2004/012390

§ 371 (c)(1),
(2), (4) Date: Nov. 10, 2008

(87) PCT Pub. No.: WO2006/048033

PCT Pub. Date: May 11, 2006

(65) Prior Publication Data

US 2009/0086701 A1    Apr. 2, 2009

(51) Int. Cl.
*H04M 1/663* (2006.01)

(52) U.S. Cl. ............... 455/412.2; 370/229; 370/236; 370/517; 370/428

(58) Field of Classification Search ............ None
See application file for complete search history.

(56) References Cited

U.S. PATENT DOCUMENTS

| | | | |
|---|---|---|---|
| 2002/0152305 A1* | 10/2002 | Jackson et al. | 709/224 |
| 2004/0223476 A1* | 11/2004 | Jose et al. | 370/338 |
| 2007/0288483 A1* | 12/2007 | Yao et al. | 707/10 |
| 2008/0040718 A1* | 2/2008 | Cloonan et al. | 718/102 |
| 2008/0091840 A1* | 4/2008 | Guo et al. | 709/231 |

FOREIGN PATENT DOCUMENTS

| | | |
|---|---|---|
| EP | 0 917 380 A | 5/1999 |
| WO | WO 01/91415 A | 11/2001 |

* cited by examiner

*Primary Examiner*—Ajit Patel

(57) ABSTRACT

A method for scheduling the delivery of a plurality of data portions to respective recipients in a data distribution network, wherein the recipients are commonly utilizing a bottleneck element limiting the performance of the data distribution network.

A proportion of recipients automatically requesting a respective data portion is determined upon receiving a respective notification message. A preferred time span for delivering the data portions is determined according to a capacity of the bottleneck element, the amount of data that is to be delivered and the proportion of recipients automatically requesting the respective data portion. The delivery of a data portion is delayed according to the preferred time span for delivering.

14 Claims, 5 Drawing Sheets

US 7,885,642 B2

METHOD AND DEVICE FOR PERFORMANCE OPTIMISATION OF A DATA DISTRIBUTION NETWORK

FIELD OF INVENTION

The invention relates to a method and a network node for performance optimisation of a data distribution network for delivering content to a plurality of recipients.

DESCRIPTION OF PRIOR ART

Data distribution networks are known in the art that are arranged to deliver a plurality of messages to a plurality of respective recipients. Said messages may contain text, multimedia data, audio data, or video data. A current data distribution network suitable for distributing multimedia messages that is known in the art is the MMS (multimedia messaging) system.

When a plurality of messages is sent to a group of recipients, said messages may comprise content that is common to the group of recipients. Further the sending of plurality of messages to a group of recipients may be triggered by an event that is common for the plurality of messages, such as an availability of the common content.

In current data distribution networks a potential recipient of content to be distributed registers to information distribution services and accepts the reception of content on its respective user device. Depending on the popularity of a service, several hundred thousand recipients may be addressed by one message.

In MMS systems multimedia messages are delivered sequentially to the recipients. Potential recipients are notified that content is available, the recipients request the content to be delivered and the content is delivered accordingly. Recipients that have activated an 'auto download' function on their respective user device request the content immediately after they have received an indication that content is available.

In current MMS systems the MMS notifications are sent out from the MMC (multi media messaging center) substantially immediately to the addressed recipients. This results in a high peak load to the MMC, since the terminals receive the notification messages within a short time interval and a high fraction of the terminals starts retrieving the content immediately after they have received a respective notification message.

If the network comprises a bottleneck element being used for the transmission of all the messages comprising the content to be delivered that bottleneck element limits the overall performance of the distribution network. If a large number of download sessions is started immediately after reception of the respective notification message this results in a large number of sessions that are started simultaneously, and the bottleneck element may become congested. If the bottleneck element comprises a bottleneck link that is commonly used for a plurality of TCP/IP (transport control protocol/internet protocol) sessions TCP/IP sessions may timeout and stall when the commonly used link is congested.

A solution to the described problem that is known in the art and that avoids congestion in such a data distribution network is to over-dimension the bottleneck element.

Document WO-01/91415 A discloses a uniform resource locator suitable for accessing a web page which is presented to a plurality of recipients practically simultaneously. In order to prevent overloading the web server providing access to the web page by simultaneous access requests, the uniform resource locator comprises code to instruct the clients potentially accessing the web page to delay the actual access for a specified time. The specified time is determined according to a delay period specified in the uniform resource locator.

EP-A-0 917 380 also relates avoiding simultaneous access requests by a plurality of content recipients, however the step of delaying is moved to an 'information transmission control apparatus'.

WO 01/37494 concerns the handling of access requests to a radio resource. Also WO 01/37494 teaches spreading access requests over a certain time period by delaying the access requests.

EP-A-1 389 857 concerns the scheduling of retransmission requests in a packet distribution network, wherein the retransmission requests concern erroneously transmitted packets. EP-A-1 389 857 teaches communicating a wanted size of a reply message and instructing the recipient to limit the reply size.

OBJECT OF THE INVENTION

Therefore it is object of the invention to provide a method and a network node for performance optimization of a data distribution network, that avoids congestion and that does not require re-dimensioning the data distribution network.

SUMMARY OF THE INVENTION

This object is achieved by the method of claim 1 and the network node of claim 10. Advantageous embodiments are described in the dependent claims.

According to the invention a method is provided for scheduling the delivery of a plurality of data portions to respective recipients in a data distribution network. The recipients are commonly utilizing a bottleneck element limiting the performance of the data distribution network, and the method comprises the steps of:

determining a preferred time span for delivering the plurality of data portions according to a capacity of the bottleneck element and an amount of data to be delivered, purposefully delaying the delivery of a data portion for a delay that is determined according to the preferred time span for delivering.

The data distribution network may comprise a cellular network be comprised in a cellular network or be connected to a cellular network. An example for a data distribution network comprised in a cellular network is a multimedia media messaging system.

The preferred time span may be an optimum time span or optimum time span that is extended by a time margin.

The preferred time span may be determined by dividing the amount of data to be delivered by the capacity of the bottleneck element.

In a particular embodiment the bottleneck element is a bottleneck link with a limited transmission capacity and wherein the amount data be delivered may be measured by a sum of bit sizes of the data portions to be delivered.

In this embodiment a preferred time span may be computed be dividing the sum of bit sizes of the data portions to be delivered by the transmission capacity, which is measured in bits per second.

By this the preferred time span is determined such that the bottleneck link may be fully utilized and on the other hand congestion is avoided.

In addition to the bottleneck element limiting the transmission capacity for a plurality of recipients, the data distribution network may comprise elements limiting the transmission capacity for individual users. E.g. the transmission bandwidth of a radio link limits the transmission capacity for an individual user. In this case the number of simultaneously handled requests could be limited such that the sum of individual transmission capacities does not exceed the transmission capacity of the bottleneck element. E.g. the sum of the bandwidths of the radio links of the simultaneously handled recipients should not exceed the bandwidth of the bottleneck link. By this, the bottleneck link may be fully utilized without being congested and at the same time the individual radio links may be fully utilized.

In another embodiment the bottleneck element is a server capable of responding to a limited number of requests to deliver a data portion per time unit and wherein the amount of data is a number of data portions to be delivered.

In this embodiment a preferred time span may be computed be dividing the number of data portions to be delivered by the number of requests per time unit the server is capable of responding to.

By this the preferred time span is determined such that the server may be fully utilized but not overloaded.

In a further embodiment a notification message indicating that a data portion is available for a recipient is sent to each of the recipients.

In this embodiment a step of determining a proportion of the recipients automatically requesting a respective data portion upon receiving a respective notification message may be included, and the preferred time span may be determined according to the proportion of recipients automatically requesting the respective data portion.

In particular the preferred time span may be computed as described above and multiplied with the determined proportion of automatically requesting recipients.

The step of determining the proportion may be performed by a configuring step which takes assumptions based on experience or measurements into account or the determining step may be based on measurements. A possibility to measure the proportion of automatically requesting recipients may be based on measurements of round-trip times between indicating that a data portion is available and delivering a data portion upon request from a recipient. If that round trip time is below a certain value, it may be assumed that the respective recipient is automatically requesting its respective data portion.

The amount of data may be a predetermined amount of data to be transmitted or an estimated amount of data to be transmitted. An example for an estimated amount of data to be transmitted is an amount of retransmitted data referring to erroneously delivered data portions. In this case the amount of data portions to be retransmitted may be estimated according to an expected error ratio and a number of data portions to be originally transmitted.

Delaying the delivery of a data portion may be performed in that the notification message indicating that the data portion is available is delayed.

This is advantageous in that modifications on a receiving side are not required.

In another embodiment the notification message may comprise a desired value of the delay for a data portion. By this the recipient may be instructed to delay requesting the data portion by the indicated delay corresponding to the desired value. By this the distribution of delay values may be controlled by a distributing node, and the distributing node is freed of the task of scheduling sending the notification messages.

In a further embodiment the notification message comprises a maximum value of a delay for a data portion. By this the recipient may be instructed to delay requesting the data portion for a randomly determined delay below the indicated maximum value of the delay. This is efficient in that the same maximum value may be sent to a plurality of recipients.

In a further embodiment the delay for a particular recipient is determined such that it is below the preferred time span for delivering the data.

In another embodiment delays for the plurality of data portions are distributed between a minimum value and the preferred time span for delivering the plurality of data portions.

The minimum value may be e.g. zero and a first data portion or a first group of data portions may be distributed without an intentionally introduced delay.

According to a further advantageous embodiment the delays are distributed largely uniformly between the minimum value and the preferred time span. This particularly advantageous for messages of the same size in that a continuous utilization of the bottleneck element may be achieved.

According to a further aspect of the invention a network node is provided for scheduling the delivery of a plurality of data portions to respective recipients in a data distribution network. The network node comprises a processing unit for determining a preferred time span for delivering the plurality of data portions according to a capacity of a bottleneck element commonly utilized by a plurality of recipients and according to an amount of data to be delivered and the network node comprises a delaying means for purposefully delaying the delivery of a data portion for a definite delay that is determined according to the preferred time span for delivering.

The preferred time span may be an optimum time span or an optimum time span extended by a time margin.

The preferred time span may be determined by dividing the amount of data to be delivered by the capacity of the bottleneck element.

In a particular embodiment the bottleneck element is a bottleneck link with a limited transmission capacity and wherein the amount data be delivered may be measured by a sum of bit sizes of the data portions to be delivered.

In this embodiment a preferred time span may be computed be dividing the sum of bit sizes of the data portions to be delivered by the transmission capacity, which is measured in bits per second.

By this the preferred time span is determined such that the bottleneck link may be fully utilized and on the other hand congestion is avoided.

In another embodiment the bottleneck element is a server capable of responding to a limited number of requests to deliver a data portion per time unit and wherein the amount of data is a number of data portions to be delivered.

In this embodiment a preferred time span may be computed be dividing the number of data portions to be delivered by the number of requests per time unit the server is capable of responding to.

By this the preferred time span is determined such that the server may be fully utilized but not overloaded.

According to a particular embodiment the network node comprises an interface for sending a notification message to a recipient indicating that a data portion is available for the recipient.

According to a further embodiment the network node comprises a determining unit for determining a proportion of recipients automatically requesting a respective data portion upon receiving a respective notification message, wherein the processing unit is adapted to determine the preferred time span according to the proportion of recipients automatically requesting the respective data portion.

The determining unit may be configured with a value of the proportion of automatically requesting users that is based on experience or previous measurements. Alternatively the determining unit may be carried out as a measurement unit and determining the proportion of automatically requesting users may be based on measurements. A possibility to measure the proportion of automatically requesting recipients may be based on measurements of round-trip times between sending an indication that a data portion is available and delivering a data portion upon a request from a recipient. If that round trip time is below a certain value, it may be assumed that the respective recipient is automatically requesting its respective data portion.

The amount of data may be a predetermined amount of data to be transmitted or an estimated amount of data to be transmitted. An example for an estimated amount of data to be transmitted is the amount of retransmitted data referring to erroneously delivered data portions. In this case the amount of data to be retransmitted may be estimated according to an expected error ratio and an amount of data to be originally transmitted.

In another embodiment of the invention the delaying means is adapted to delay sending the notification message. This is advantageous in that modifications on a receiving side are not required.

In a further embodiment the notification message comprises a desired value of the delay for the data portion.

By this a recipient may be instructed to delay requesting the data portion for a delay corresponding to the desired value. By this the distribution of delay values may be controlled by the network node, and the network node is freed of the task of scheduling sending the notification messages.

In another embodiment the notification message comprises a maximum value of the delay for the data portion. By this the recipient may be instructed to delay requesting the data portion for a randomly determined delay below the indicated maximum delay. This is advantageous in that the same maximum delay value may be sent to a plurality of recipients.

In a further advantageous embodiment the network node comprises a processing device for determining the delay for a particular recipient such that it is below the preferred time span for delivering the data.

In a another advantageous embodiment the network node comprises a processing device for determining delays that are distributed between a minimum value and the preferred time span for delivering the plurality of data portions.

The minimum value may be e.g. zero and a first data portion or a first group of data portions may be distributed without an intentionally introduced delay.

According to a further advantageous embodiment the processing device is adapted to determine delays that are distributed largely uniformly between the minimum value and the preferred time span. This is advantageous in that a continuous utilization of the bottleneck element may be achieved.

BRIEF DESCRIPTION OF THE SEVERAL VIEWS OF THE DRAWING(S)

Figure 4:
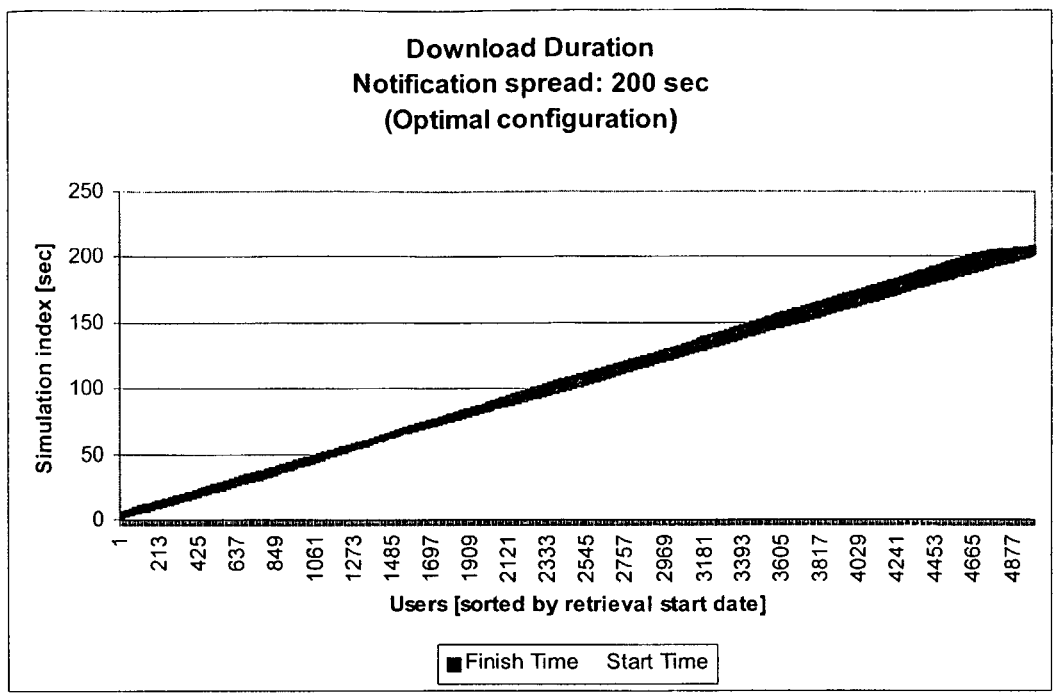
Figure 5:
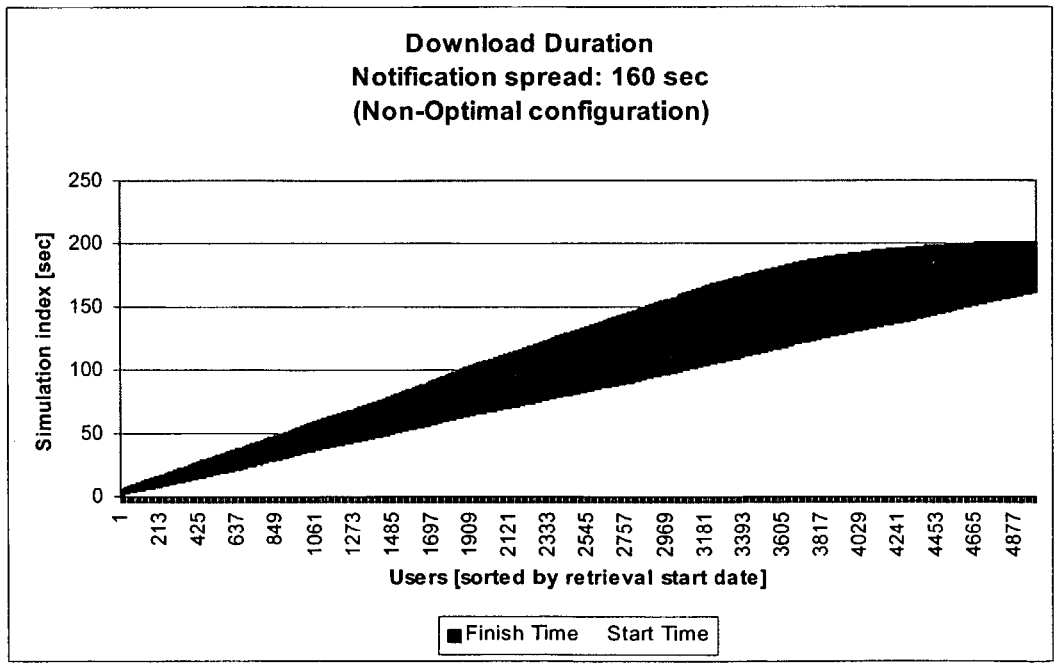
Figure 6:
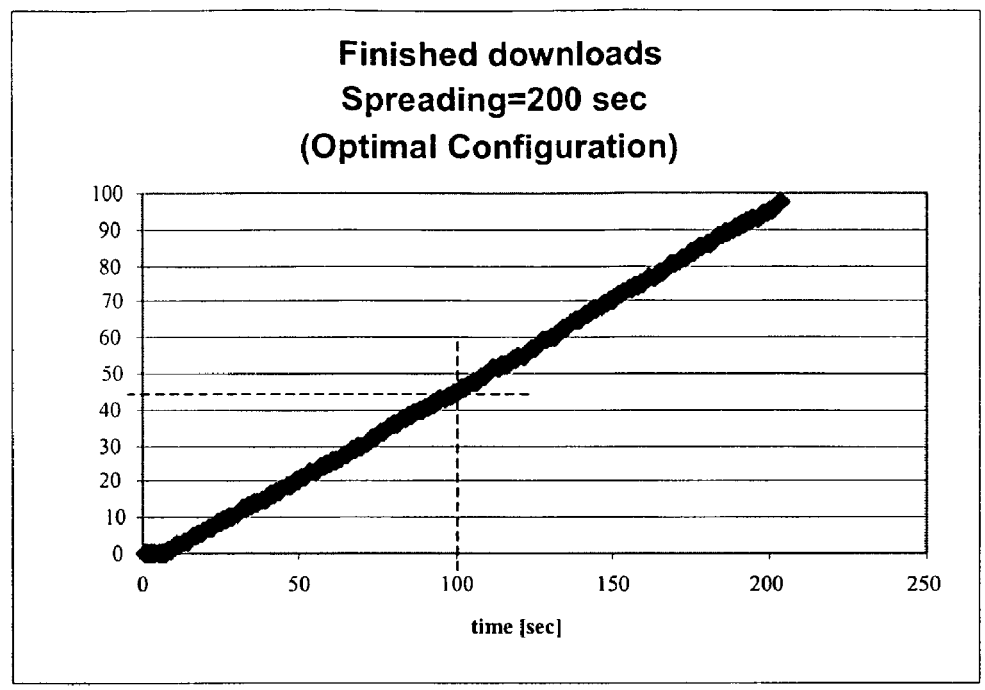
Figure 7:
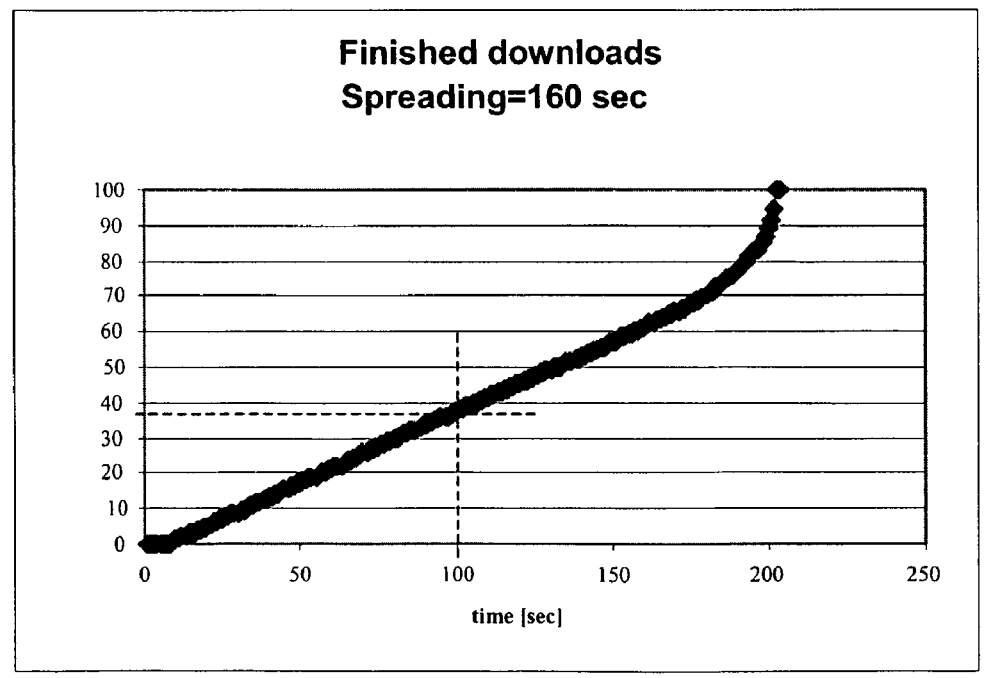
Figure 8:
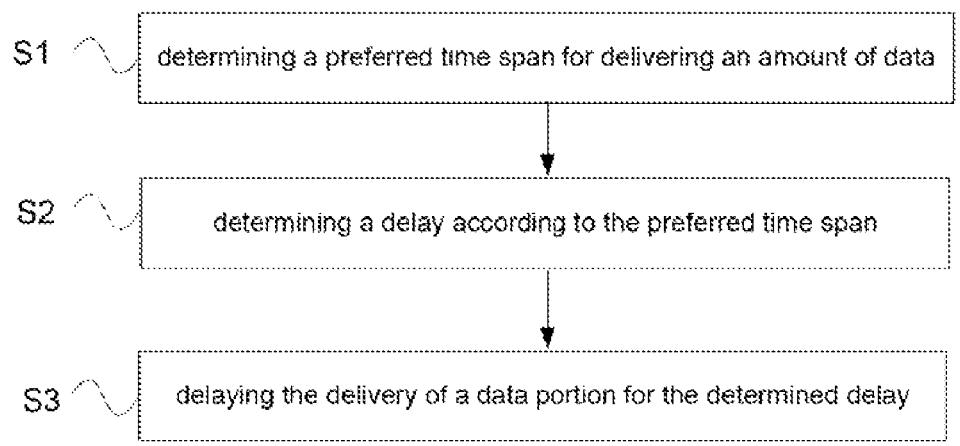
Figure 9:
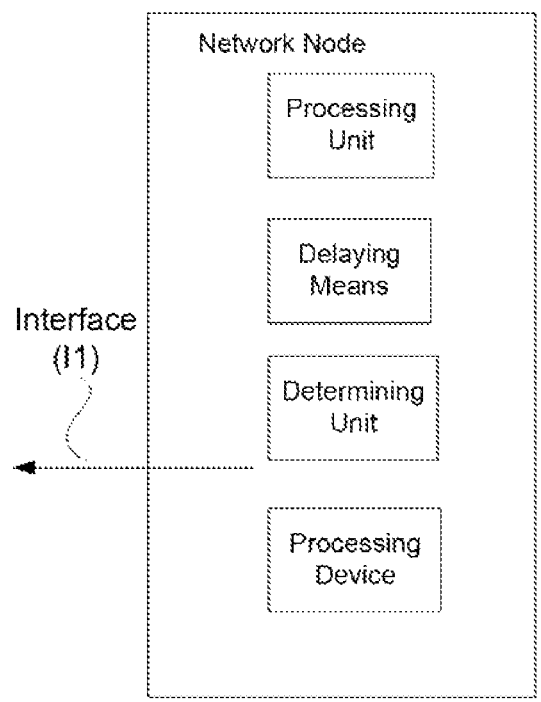

FIG. 4, depicts a simulation in which delay values for the plurality of messages are distributed uniformly between zero and a preferred time span of 200 s FIG. 5, illustrates a simulation in which delay values are distributed uniformly between zero and a maximum delay value of 160 s FIG. 6 depicts the measurement in that delay values for the plurality of messages are distributed uniformly between zero and a preferred time span of 200 s FIG. 7 illustrates a result of a simulation in that the delay values are distributed uniformly between zero and a maximum delay value of 160 s FIG. 8 depicts a method for scheduling the delivery of a plurality of data portions according to the invention; and FIG. 9 depicts network node NN for scheduling the delivery of a plurality of data portions to respective recipients in a data distribution network.

DETAILED DESCRIPTION OF PREFERRED EMBODIMENTS

Figure 1:
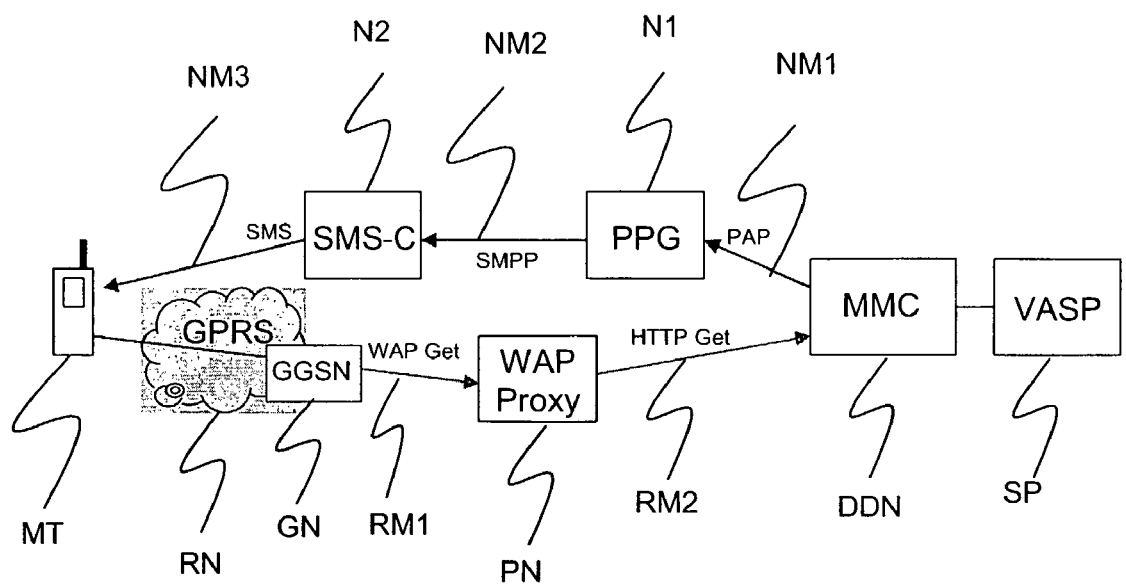
FIG. 1 depicts a data distribution network embodying the present invention by example of a multimedia messaging system.

FIG. 1 depicts a data distribution network embodying the present invention by example of a multimedia messaging system. Though some elements of the data distribution network are exemplified by elements of a multimedia messaging system this shall not be understood as limiting the applicability of the invention, which may be applicable in any kind of data distribution network comprising a bottleneck link.

The data distribution network comprises a service provider SP, often termed a 'value added service provider', that distributes content to a plurality of recipients, one of which is pictured as terminal MT. When content is available for distribution to the plurality of recipients, the service provider forwards the content to a data distribution node DDN, that is requested to distribute the content to the plurality of recipients, the content is addressed to. The group of recipients may be defined in that the members of the group of recipients have subscribed to a particular service for distributing information of a particular kind to the group of recipients. A typical example of such services is a service distributing information related to sports events. In the example of the multimedia messaging service the data distribution node is termed MMC (multimedia messaging centre). The content may be distributed using multicast, or the content may be distributed by sequentially sending messages to the respective recipients the content is intended for. The messages may be sent on the initiative of the data distribution node or the availability of the content may be indicated towards the recipients and the content is requested by the recipients upon receiving that indication that content is available. The latter is applied in the context of a multimedia messaging systems and will be described further.

The notification that content is available may be sent as a first message NM1 from the data distribution node DDN to a first node N1 in a chain of nodes sending the notification message, a second message NM2 from the first node N1 to a second node N2 in that chain and a third message NM3 from the second node N2 to the terminal MT.

In the context of the multimedia messaging system, the first message NM1 may be a PAP (Push Access Protocol) message from the data distribution node DDN, that is embodied as MMC (multimedia messaging centre) to the first node N1 that is embodied as push PPG (Push-Proxy-Gateway) the second message NM2 may be sent according to the SMPP (Short Message Peer to Peer) protocol to the second node N2 that is embodied as SMS-C (Short Message Service-Centre) and the third message may be sent as SMS (Short Message Service) message accordingly.

Upon reception of the indication that content is available, the terminal MT requests the content from the data distribution node DDN, that delivers the content to the terminal MT accordingly. In the example of the multi media messaging system the terminal MT may be a mobile terminal that is connected to the data distribution node DDN embodied as MMC (multimedia messaging centre), via a radio network RN, a gateway node GN between the radio network and a fixed core network, and a proxy node PN.

The radio network RN may be embodied as GPRS (General Packet Radio Service) network, the gateway node GN may be embodied as GGSN (gateway GPRS support node), and the proxy node PN may be embodied as WAP (wireless application protocol) proxy. In this embodiment, the connection between the terminal MT and the proxy node PN comprises a WAP session between the terminal MT and the proxy node PN and an HTTP (hypertext transfer protocol) session between the proxy node PN and the data distribution node DDN.

The terminal MT activates a PDP context to the gateway node GN and requests the content in a request message that may be split into a first request message RM1 and a second request message RM2, e.g. a WAP get message and a HTTP get message. The content may be delivered in a HTTP response and a WAP response accordingly.

Alternatively the network may not comprise a proxy node and the mobile terminal MT issues an HTTP get request directly towards the data distribution node DDN.

The data distribution network comprises a bottleneck element, i.e. an element limiting the overall performance of the data distribution network in certain conditions. The bottleneck element may be a link with a limited transmission capacity. In the context of the multimedia messaging system the link between the multimedia-messaging centre and the gateway GPRS support node may form a bottleneck element.

Alternatively or in addition the bottleneck element may be a server capable of responding to a limited number of requests per time unit. E.g. in the above described example of a multimedia messaging system, the MMC (multimedia messaging centre) is capable of responding to a limited number of HTTP requests per time unit and the WAP gateway is capable of receiving and converting a limited number of WAP requests only. I.e. in a multimedia messaging system both the WAP gateway and the MMC (multimedia messaging centre) may form a bottleneck element.

To avoid congestion or overload of the bottleneck element the delivery of the messages is purposefully delayed for an individual delay that is determined for each of the recipients according to a preferred time span for delivering the plurality of messages. The preferred time span for delivering the plurality of messages is determined according to a capacity of the bottleneck element and an amount of messages to be delivered, preferably also considering the available radio link transmission rate.

The preferred time span may be an optimum duration for delivering the messages, whereby an optimum duration may be optimum in that the utilization of a particular network element, an actual duration for delivering the content, or any other parameter or set of parameters describing a performance of the data distribution network is optimised.

Purposefully delaying the delivery of a particular message may be implemented in that the sending first notification messages NM1 is delayed.

To delay sending notification messages to each member of the group of recipients, notifications to the recipients of the group could be sent out with a constant rate, the notification rate $r_n$.

For a preferred time span of $t_p$ seconds and a number of messages $n_m$ that have to be delivered, the notification rate would be $$r_n = n_m/t_p.$$

Alternatively a time stamp indicating when a notification message should be sent could be appended to each notification message to a recipient in the group.

In an alternative embodiment the step purposefully delaying the delivery of a message is implemented in that the first to third notification message NM1 to NM3 each comprise a desired value of the delay and the notification messages NM1 . . . NM3 request the terminal MT in this way to delay sending the first request message RM1 by a delay that is determined according to the desired value.

In another implementation of the delaying step the first to third notification message NM1 to NM3 each comprise a maximum delay and the terminal randomly determines a delay between zero and the indicated maximum delay.

The preferred time span may be computed according to a time span for delivering the messages, that corresponds to a full utilization of the bottleneck element, when the bottleneck element is not yet overloaded.

The proxy node PN or the data distribution node DDN may be characterized by a certain hit rate $r_h$, i.e. a number of message conversions that the proxy node PN may perform per time unit or a number of requests per time unit that the data distribution node DDN may handle. If a number of messages $n_m$ has to be delivered, the preferred time span $t_p$ for delivering the messages would be $$t_p = n_m/r_h.$$

The bottleneck link between the data distribution node DDN and the gateway node GN may be characterized by a certain transmission capacity of the link $c_l$, i.e. a number of bits per second that may be transmitted via the link. If the total amount of data that should be delivered is $d_d$ bits, the preferred time span $t_p$ for delivering the messages would be $$t_p = d_d/c_l.$$

The preferred time span $t_p$ may be extended by a margin, in order to not fully utilize the link capacity, the capacity of the proxy node PN, or the capacity of the data distribution node DDN.

Alternatively or in addition the preferred time span $t_p$ may be multiplied by a factor representing the proportion of the recipients automatically requesting the content to be delivered upon receiving a respective notification message.

The proportion of automatically requesting recipients may be measured by measurements of round-trip times between sending the first notification message NM1 and receiving the second request message RM2 in the data distribution node DDN. If that round trip time is below a certain value, it may be assumed that the respective recipient is automatically requesting its respective data portion. In the embodiment in that a desired value for a delay is sent to the terminal, that desired value may advantageously be taken into account when making the assumption.

The amount of data to be transmitted may be a predetermined amount or an estimated amount of data to be transmitted. An example for an estimated amount of data to be transmitted is the amount of retransmitted data referring to erroneously delivered data. In this case the bit size of retransmitted data may be estimated as the bit size of data to be originally transmitted multiplied by an expected error ratio.

Figure 2:
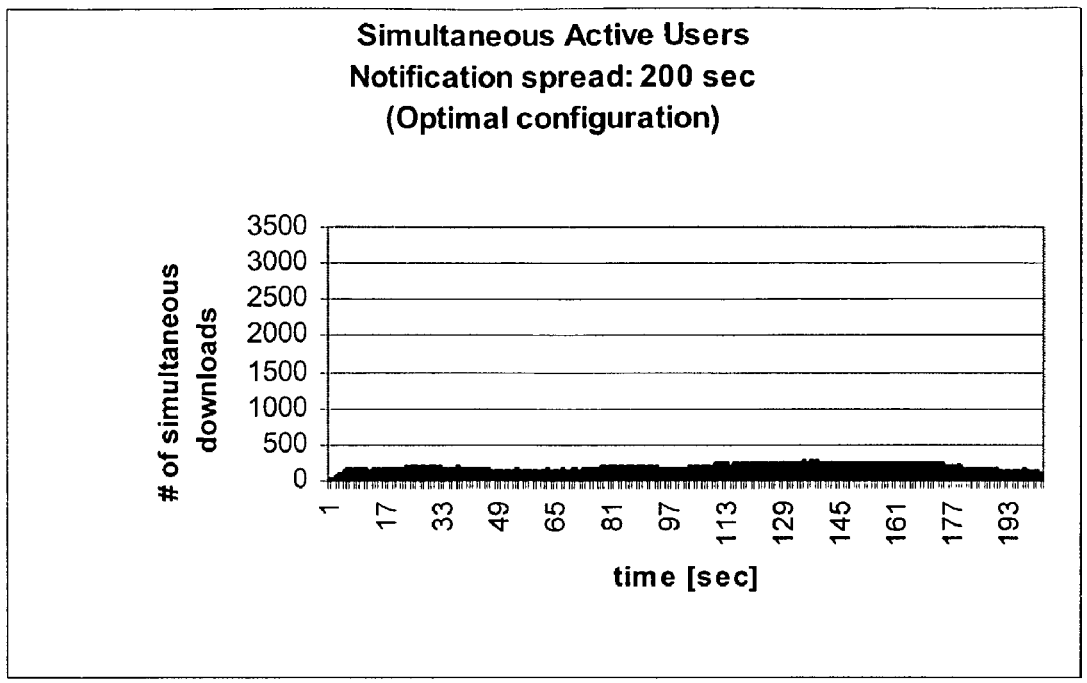
FIG. 2 depicts a simulation result when applying the invention to the above described data distribution network.

FIG. 2 depicts a simulation result of a simulation when applying the invention to the above described data distribution network. The simulation is based on an analytical model that assumes that the capacity of the bottleneck link between the data distribution node DDN and the gateway node GN is shared equally between the terminals to that content is distributed simultaneously.

The parameters for the simulation are a message size of 50 Kbytes, a group size of 5000 users to that content is to be distributed. The bottleneck link between the data distribution node DDN and the gateway node GN has a bottleneck link rate of $c_f$=10 Mbits per second. Further the capacity of each radio link towards a respective terminal is limited to 64 Kbits per second. I.e. the total amount of data to be delivered $d_d$ is $d_d$=5000*50 Kbytes=1024 Mbits.

Applying the above formula for a preferred duration when the bottleneck link is characterized by its transmission capacity $c_f$ and the amount of data is characterized by a bit size $d_d$, the preferred time span $$t_p = d_d/c_f = 204.8 \text{ s}$$

The parameters have been chosen to demonstrate the advantages provided when applying the invention and are not intended characterize a real world network.

Figure 3:
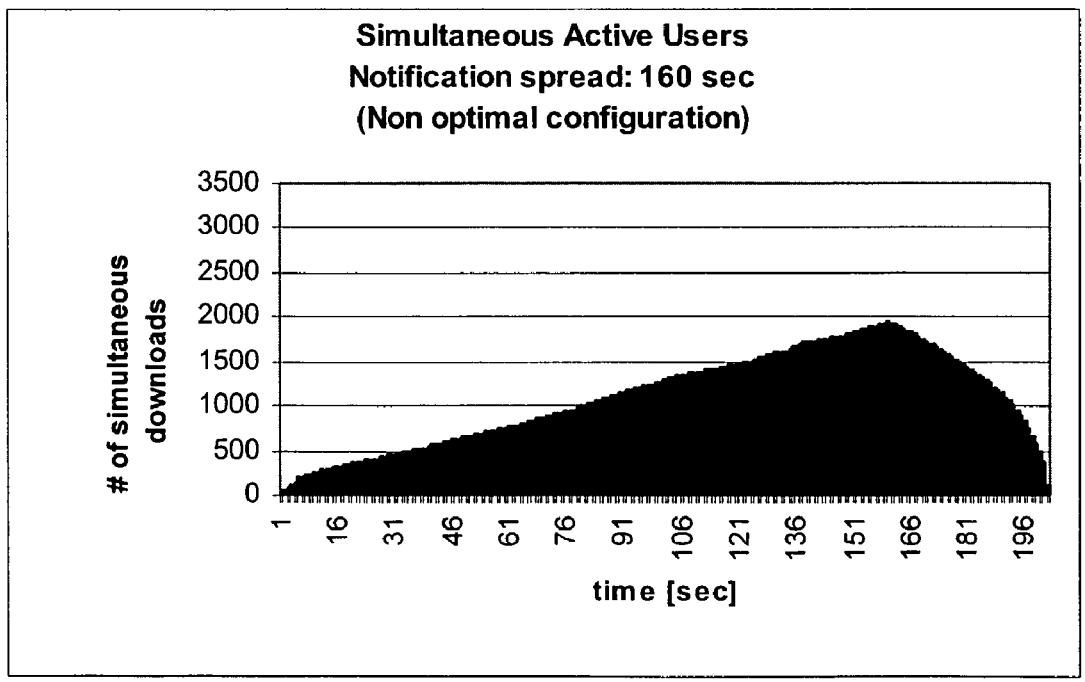
FIG. 3, illustrates a simulation in which delay values are distributed uniformly between zero and a maximum delay value of 160 s.

FIGS. 2 and 3 depict the number of simultaneously active WAP sessions against the simulation time that runs from zero ~205 seconds. In the simulation depicted in FIG. 2, the delay values for the plurality of messages are distributed uniformly between zero and a preferred time span that has been set to 200 s i.e. roughly the preferred time span calculated as above. In the simulation depicted in FIG. 3 the delay values are distributed uniformly between zero and a maximum delay value of 160 s, which is significantly below the preferred time span. The simulation results show, that the number of simultaneously active users is significantly lower when applying the preferred time span of 200 s as compared to the maximum time span that is not configured according to the preferred time span. By this the amount of software resources can be significantly lowered when applying the preferred time span.

FIGS. 4 and 5 depict the simulation time against the number of terminals towards that a message has been sent, and the number of users that have received the content. In other words, the terminals are sorted in the order in that a respective message is sent to them and an index value is assigned to each recipient accordingly. The lower of the two depicted time values represents the time point, at which sending a message towards the recipient bearing the respective index is initiated and the upper of the two depicted values represents the time point at which the respectively indexed recipient has received its message. In the simulation depicted in FIG. 4, the delay values for the plurality of messages are distributed uniformly between zero and a preferred time span of 200 s i.e. roughly the preferred time span calculated as above. In the simulation depicted in FIG. 5 the delay values are distributed uniformly between zero and a maximum delay value of 160 s. When comparing FIGS. 4 and 5 it is clearly visible, that time span between initiating delivering a message and the actual delivery are significantly shorter when applying the preferred time span of FIG. 4 compared to the non-optimum time span of FIG. 5.

FIGS. 6 and 7 visualize a further measurement taken from the simulations described above which is the percentage of terminals, towards that a message has been delivered against the simulation time. FIG. 6 depicts the measurement in that delay values for the plurality of messages are distributed uniformly between zero and a preferred time span of 200 s; FIG. 7 depicts a result of the simulation in that the delay values are distributed uniformly between zero and a maximum delay value of 160 s. In the first case the number of recipients that have received the content increases largely linearly during the whole simulation time. In the second, non-optimum configuration the number of recipients increases also linearly in the beginning, but with a lower rate, e.g. after 100 seconds, the percentage of recipients that have received the content in the first case is approximately 44%, whereas the respective percentage is only 38% in the non-optimum configuration. This corresponds to a performance increase of ~18%.

FIG. 8 depicts a method for scheduling the delivery of a plurality of data portions according to the invention. According to the depicted method the plurality of data portions are delivered to respective recipients in a data distribution network. The recipients are commonly utilizing a bottleneck element limiting the performance of the data distribution network.

The method comprises a first determining step S1 in that a preferred time span for delivering the plurality of data portions is determined according to a capacity of the bottleneck element and an amount of data to be delivered. The method further comprises a second determining step S2 in that an individual delay for each data portion is determined according to the preferred time span for delivering the data. The method further comprises a delaying step S3 for each data potion in that delivering the respective data portion is delayed for the determined individual delay.

FIG. 9 depicts network node NN for scheduling the delivery of a plurality of data portions to respective recipients in a data distribution network. The network node comprises a processing unit PU for determining a preferred time span for delivering the plurality of data portions according to a capacity of a bottleneck element commonly utilized by a plurality of recipients and according to an amount of data to be delivered.

The network node further comprises a delaying means DM for delaying the delivery of a data portion for a definite delay that is determined according to the preferred time span for delivering.

Advantageously the network node NN further comprises an interface I1 for sending a notification message to a recipient indicating that a data portion is available for the recipient.

The network node NN may further comprise a determining unit DU for determining a proportion of recipients automatically requesting a respective data portion upon receiving a respective notification message. In this embodiment the processing unit PU is adapted to determine the preferred time span according to the proportion of recipients automatically requesting the respective data portion.

The network node may further comprise a processing device PD for determining the delay for a particular recipient such that it is below the preferred time span optimum for delivering the data.

The processing device PD may determine the delays such that they that are distributed largely uniformly between a minimum value and the preferred time span for delivering the plurality of data portions.

The invention claimed is:

1. A method for scheduling the delivery of a plurality of data portions to respective recipients in a data distribution network, wherein the recipients are commonly utilizing a bottleneck element limiting the performance of the data distribution network and wherein a notification message indicating that a data portion is available for a recipient is sent to each of the recipients, the method comprising the steps of:

determining a proportion of the recipients automatically requesting a respective data portion upon receiving a respective notification message, determining a preferred time span for delivering the plurality of data portions according to a capacity of the bottleneck element, to an amount of data to be delivered, and to a proportion of recipients automatically requesting the respective data portion, and delaying the delivery of a data portion for a definite delay that is determined according to the preferred time span for delivering.

2. The method according to claim 1, wherein the notification message is delayed.

3. The method according to claim 1, wherein the notification message comprises a desired value of the delay for a data portion.

4. The method according to claim 1, wherein the notification message comprises a maximum value of the delay for a data portion.

5. The method according to claim 1 wherein the delay for a particular recipient is determined such that it is below the preferred time span for delivering the data.

6. The method according to claim 1, wherein delays for the plurality of data portions are distributed between a minimum value and the preferred time span for delivering the plurality of data portions.

7. The method according to claim 6, wherein the delays are distributed largely uniformly between the minimum value and the preferred time span.

8. A network node for scheduling the delivery of a plurality of data portions to respective recipients in a data distribution network, the network node comprising an interface (I1) for sending a notification message to a recipient indicating that a data portion is available for the recipient, the network node comprising:

a determining unit for determining a proportion of recipients automatically requesting a respective data portion upon receiving a respective notification message, a processing unit for determining a preferred time span for delivering the plurality of data portions according to a capacity of a bottleneck element commonly utilized by a plurality of recipients, according to an amount of data to be delivered and according to the proportion of recipients automatically requesting the respective data portion, and a delaying means for delaying the delivery of a data portion for a definite delay that is determined according to the preferred time span for delivering.

9. The method according to claim 8, wherein the delaying means is adapted to delay sending the notification message.

10. The method according to claim 8, wherein the notification message comprises a desired value of the delay for the data portion.

11. The method according to claim 8, wherein the notification message comprises a maximum value of the delay for the data portion.

12. The method according to claim 8, comprising a processing device for determining the delay for a particular recipient such that it is below the preferred time span optimum for delivering the data portion.

13. The method according to claim 8, comprising a processing device for determining delays that are distributed between a minimum value and the preferred time span for delivering the plurality of data portions.

14. The method according to claim 13, wherein the processing device is adapted to determine delays that are distributed largely uniformly between the minimum value and the preferred time span.

\* \* \* \* \*

UNITED STATES PATENT AND TRADEMARK OFFICE
CERTIFICATE OF CORRECTION

| | | |
|---|---|---|
| PATENT NO. | : 7,885,642 B2 | Page 1 of 1 |
| APPLICATION NO. | : 11/718481 | |
| DATED | : February 8, 2011 | |
| INVENTOR(S) | : Lohmar et al. | |

It is certified that error appears in the above-identified patent and that said Letters Patent is hereby corrected as shown below:

On the Face Page, in Field (57), under "ABSTRACT", in Column 2, Lines 6-13, delete "A proportion......for delivering", and insert the same at Line 5, after "network.", as a continuation of the paragraph.

In Column 2, Line 59, delete "be dividing" and insert -- by dividing --, therefor.

In Column 3, Line 17, delete "be dividing" and insert -- by dividing --, therefor.

In Column 4, Line 41, delete "be dividing" and insert -- by dividing --, therefor.

In Column 4, Line 52, delete "be dividing" and insert -- by dividing --, therefor.

Signed and Sealed this
Fifth Day of April, 2011

David J. Kappos
*Director of the United States Patent and Trademark Office*